(No Model.)
A. G. GEKELER.
POTATO PLANTER.
No. 490,555. Patented Jan. 24, 1893.
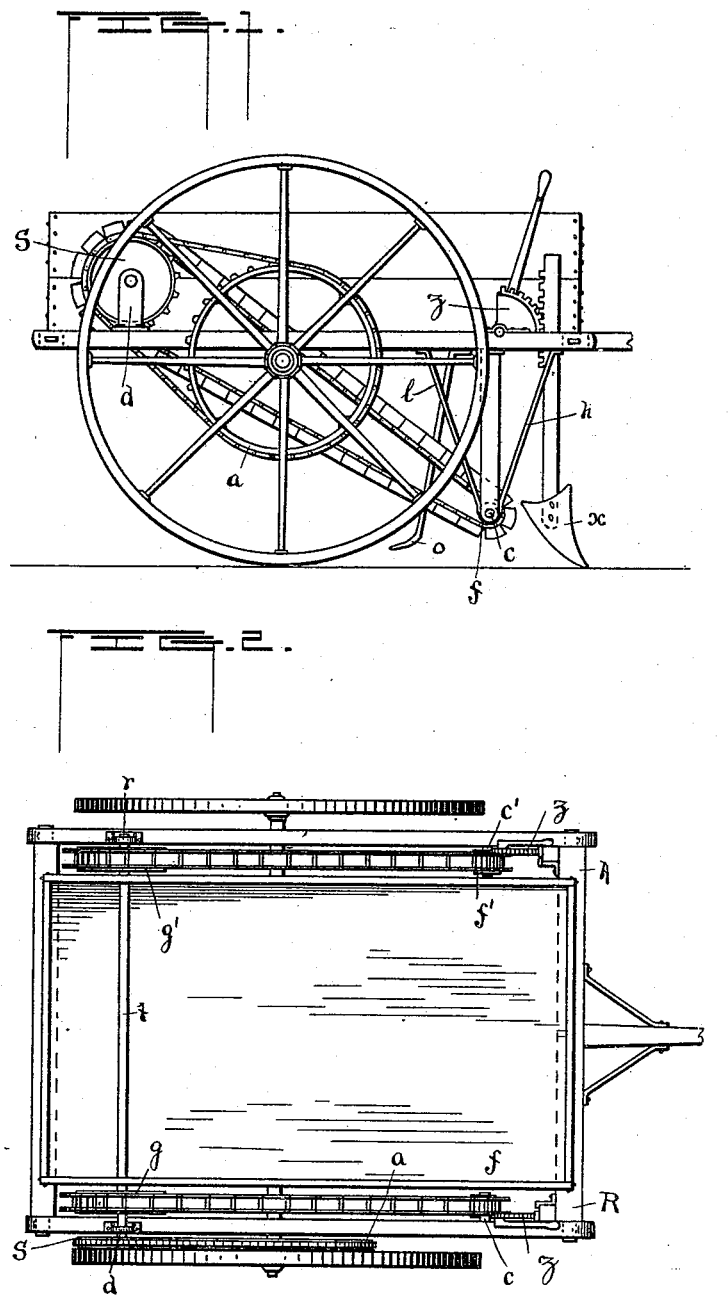
Witnesses
Arch. M. Catlin.
Laura B. Holderby
Inventor
A. G. Gekeler
by
Benj. R. Catlin Attorney

United States Patent Office.

ALVIN G. GEKELER, OF FROSTBURG, MARYLAND.

POTATO-PLANTER.

SPECIFICATION forming part of Letters Patent No. 490,555, dated January 24, 1893.

Application filed August 31, 1892. Serial No. 444,698. (No model.)

*To all whom it may concern:*

Be it known that I, ALVIN G. GEKELER, a citizen of the United States, residing at Frostburg, in the county of Allegany and State of Maryland, have invented a new and useful Potato-Planter, of which the following is a specification.

The invention is designed for the purpose of planting potatoes in a much quicker, easier and cheaper manner and with greater regularity than is possible by a hoe; and it consists in the construction hereinafter described and particularly pointed out.

In the accompanying drawings: Figure 1 is a side elevation; and Fig. 2 is a plan.

On the front beam R. A of the frame, which is placed upon a two wheeled cart, and at a distance of three feet apart, two cultivator shovels $x$ are attached, which make the furrows for the reception of the seed. The standards to which the cultivator shovels are affixed are cogged on the rear side and can be raised or lowered by the cogged regulating gear or wheel $z$.

On the inside of the right hand wheel of the cart and about the hub of the same is affixed a sprocket or chain cog-wheel $a$ which moves with the cart wheel and of course in the same direction.

On the rear of the frame and elevated thereupon by the brackets $r$. $d$ is affixed a shaft, having a chain cog wheel S running in the same plane with the wheel $a$. The cog wheels $a$ and S are connected by a link-belt thus turning the shaft toward the front. Two other wheels $g$ and $g'$ are affixed to the same shaft inside the frame three feet apart and in a line with the cultivator shovels $x$; and below the frame and toward the front, another shaft $c$ and $c'$ parallel with the shaft $t$, is fastened by braces or brackets $l$, $h$. On this shaft $c$, $c'$ are affixed two wheels $f$, and $f'$, running in the same plane with the wheels $g$ and $g'$ and in a line with the cultivator shovels $x$.

Over the wheels $g$ and $f$ on the right side and the wheels $g'$ and $f'$ on the left side elevators or carriers are run, having pockets at the proper intervals, by which the seed potatoes are carried forward toward the wheels $f$ and $f'$ and when the carriers revolve about the same the seed drops by the force of gravitation into the furrows, where it is covered by the foot $v$. The pockets with which the carriers are furnished consist of squares of light sheet iron about three feet by three feet, bent so as to form a right angle, having one side two feet the other side one foot in length and riveted to a leather or canvas belt by the shorter side. These carriers are to be fed by a boy who rides upon the machine.

Upon the frame and occupying the space between the elevators or carriers is a box to carry a quantity of seed, and also seats for the driver and feeder of the machine.

I am aware that machines are made for the planting of potatoes and therefore do not claim priority for the invention of such a machine generally.

It is characteristic of my improvement that the seed which is always in sight of a person situated in the box is carried down near the ground and dropped but a few inches whereby full opportunity is given to detect poor seed or accidental omission thereof and whereby the danger of breaking off potato sprouts is greatly lessened. The carriers are preferably supplied by hand not only to simplify the machine but to avoid injury to the seed.

What I do claim as my invention and desire to secure by Letters Patent is:—

1. In a machine for planting potatoes, a cart, the frame, the box supported within the frame, the shovel, the seed carriers situated between the side bars of the frame and the box and provided with dropping pockets, said carriers extending from about the level of the box to the level of the shovel, whereby the seed is dropped directly from the pockets into the furrow; substantially as set forth.

2. In a machine for planting potatoes, a cart, the frame, the box supported within the frame, the shovel, the seed carriers situated between the side bars of the frame and the box and provided with dropping pockets, said carriers consisting of endless belts passing obliquely down between said frame bars and box and about wheels below and above the box, and terminating near the ground behind the shovel whereby seed deposited in the pockets near the rear and top of the box is dropped directly from the pockets into the furrow, substantially as set forth.

ALVIN G. GEKELER.

Witnesses:
 THOS. G. PORTER,
 LLOYD F. TAYLOR.